J. W. TROY.
ELEVATING MEANS.
APPLICATION FILED FEB. 14, 1913.
1,115,750.
Patented Nov. 3, 1914.
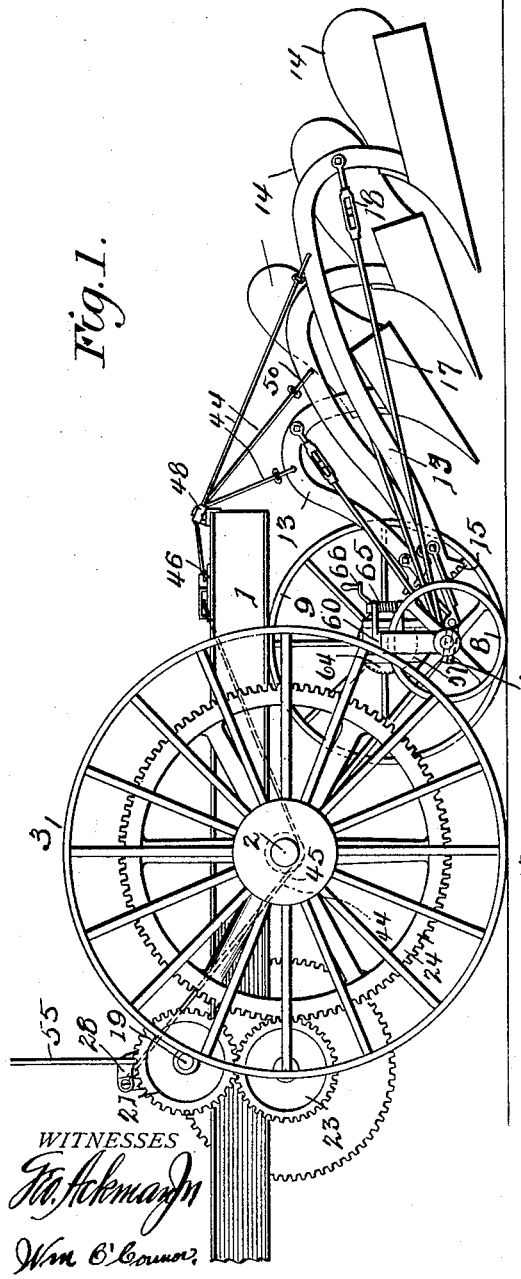
WITNESSES
INVENTOR
John W. Troy
Gould & Gould Attorneys.

UNITED STATES PATENT OFFICE.

JOHN W. TROY, OF PORT HURON, MICHIGAN.

ELEVATING MEANS.

1,115,750.  Specification of Letters Patent.  Patented Nov. 3, 1914.

Application filed February 14, 1913. Serial No. 748,362.

*To all whom it may concern:*

Be it known that I, JOHN W. TROY, a citizen of the United States, residing at Port Huron, in the county of St. Clair and State of Michigan, have invented certain new and useful Improvements in Elevating Means, of which the following is a specification.

The invention relates to an improvement in elevating means for gang plows and particularly to a means for raising and lowering the plows as a gang and to a means for simultaneously adjusting the cutting depth of the plows.

The main object of the present invention is the provision of automatically operated pick up and release mechanism for elevating or lowering the plows, said mechanism being designed to be operated in the forward travel of the plow solely at the will of the operator, whereby the plow implements can be raised or lowered at such times as may be found desirable and necessary.

A further object of the invention is the provision of means in the use of which the plow implement may be regulated to the desired cutting depth.

The invention in its preferred form of details will be described in the following specification, reference being had particularly to the accompanying drawings, in which:—

Figure 1 is a view in side elevation of a gang plow constructed in accordance with my invention. Fig. 2 is an enlarged sectional view taken through the lifting shaft, illustrating one of the implement operating means. Fig. 3 is a front elevation partly in section illustrating a portion of the lifting means.

Referring particularly to the accompanying drawings, the improved gang plow which is shown in this instance as designed for use with a traction engine comprises a frame including main beams 1 supported upon an axle 2 on which beyond the main beams are mounted ground wheels 3.

A draw bar 4 is arranged transversely of and below the main beams and is movably connected to the axle 2 by any suitable means. Braces may be used if desired to stiffen the connection of the draw bar to the axle to prevent lateral play of the former. The draw bar at the land or inner end terminates adjacent one of the ground wheels and is provided with a land roller 8. The opposite end of the draw bar extends beyond the opposite ground wheel and is provided with a comparatively large furrow wheel 9.

Blocks 11 are secured to the draw bar being each provided with rearwardly extending ears 12 between which is pivotally secured the beam 13 of a plowing implement 14, the forward end of the beam having the usual notched sections 15 to coöperate with a dog 16 carried by the block whereby the cutting depth of the plows may be initially adjusted. Each plowing implement is further connected to the draw bar by a brace 17 secured at one end to the land side of the plowing implement and at the opposite end to the draw bar, the brace being angularly related to the beam of the plowing implement to prevent lateral play of such implement. The brace 17 is preferably made in sections the adjacent ends of which are threaded and connected through the medium of the ordinary turn buckle 18, whereby any plowing implement may be adjusted in an obvious manner.

Supported on the main beams 1 in advance of the axle 2 is what I term a lifting shaft 19. This shaft is mounted on bearings 20 secured upon the main beams and is terminally provided with gears 21 and 22 which through intermediate gears 23 are in mesh with driving gears 24 secured upon the ground wheels 3, whereby in the travel of the machine over the ground, the ground wheels serve to impart motion to the lifting shaft 19. A clutch connection 25 is arranged on the lifting shaft, serving to connect the gear 22 therewith, whereby difference in the distance traveled by the respective ground wheels in turning is compensated for.

Mounted upon the lifting shaft are the lifting members, there being three such members illustrated as but three plowing implements are shown. These lifting members are of identical construction and a detailed description of one will suffice for all. Each lifting member comprises an arm 26 having a comparatively broad bearing section 27 loosely mounted upon the lifting shaft 19, the free terminal of the arm having a right angled dog 28 pivotally connected thereto and normally held in lowered or operative position by a coil spring 30 connected to the dog and to the arm. Fixed on the lifting shaft 19 immediately adjacent the arm is a disk 31, the peripheral edge of which is concentric with the shaft throughout the greater length of such edge, the remaining length of such edge being formed with a radial projection 32 terminating in an outwardly extending stop lug 33, the edges 34 of the stop lug and 35 of the projection being at a gradual inclination to the normal peripheral edge of the disk.

Loosely mounted upon the shaft 19 beyond the disk as compared with the cooperating lifting arm is a locking plate 36, of segmental form and of a radius exceeding the radius of the disk. The locking plate is held in fixed position by a bracket 37 terminally secured to the plate and to a brace bar 38 fixed to and transversely of the main beams. The outer or free edge of the plate is formed with a locking recess 39 of such depth that its bottom wall 40 is coincident with the normal peripheral edge of the disk, the rear edge of such recess, that is the edge toward the plowing implements forming an abrupt locking shoulder 41 and the forward edge a shoulder 42 of gradual inclination with respect to the bottom wall 40 of the recess. The parts are so arranged that the operative end of the dog 28 moves in a path coincident with the outer or free edge of the locking plate, so that said dog overlies the adjacent disk 31, the operative end of the dog having a transverse dimension to cause said end to bear at all times upon the peripheral edge of the disk.

To each arm 26 there is connected at 43 one end of the cable 44 which passes rearwardly beneath the pulley 45 mounted loosely on the axle 2 and over a pulley 46 secured upon a bar 47 arranged transversely of the main beam, preferably inclined from a right angle thereto. From the pulleys 46 the cables 44 pass around other pulleys 48 mounted in the bar 49 secured transversely of the rear end of the main beam, and from the pulleys 48 said cables are terminally connected at 50 to the respective plow implements.

Pivotally mounted on each disk 31 is a trip 51 including an operating segment 52 and a weighted segment 53, the latter serving to always maintain the operating segment in an upright position when said segment is free. The trip member is pivoted in approximately radial alinement with the projection 32, and the curvature and length of the operating edge of the segment 52 is such that when said segment is turned into registry with the projection the outer edge of said segment will be in practical coincidence with the outer free edge of the stop lug 33.

The shaft 19 is operatively connected with the driving gear 21 when it is desired to operate the parts through a clutch member 54 keyed upon the shaft and operated by a hand lever 55 to move said member 54 into and out of operative coaction with a coöperating clutch member 56 fixed to the gear 21, it being obvious from this construction that the lifting members are operated solely at the will of the driver through proper manipulation of the clutch member, the clutch members 54, 56 being disengaged after each lifting or lowering action.

The end of the draw bar carrying the furrow wheel 9 is connected to uprights 57 which uprights slidably receive a block 60 mounted on the axle 61 of the furrow wheel 9. A worm wheel 64 is operated by a worm 65 carried by the block 60, the worm having an operating handle 66, whereby to elevate the axle. This detail forms no part of the subject of the present invention.

In operation assuming the lifting arms 26 to be in position for holding the plow lifted or elevated, that is with the dogs 28 in the recesses 39 of the locking plate, the operator, if desiring to lower the plows operates the clutch member 54 to actuate the lifting shaft. This turns the disk 31 and as the projection 32 rides beneath the dogs they are elevated from the recesses 39. At the same time the operating segment 52 of the trip, by reason of the position maintained under the gravital influence of the segment 53, overlies or registers with the projection and forms an extending edge therebeyond which will guide the dog over the stop lug 33. The plows thus move to lowered position by gravity for the plowing operation. When it is desired to elevate the plows the clutch 54 is again thrown in and on rotation of the disk the stop lug 33 engages the dogs and carries the arms forwardly until the dogs drop into the recesses 39, the continued movement of the arm under the influence of the stop lugs causing said dogs to be elevated above the stop lugs by riding up the inclined shoulder 42 of the recess, the release of the dogs from the stop lugs causing said dogs to drop back into the recesses in which they are held by the shoulder 41. In this movement the trip element is without function as in the initial engagement of the stop lug and dog said element is held out of the way by the weighted segment.

What is claimed is:—

1. A raising and lowering means including a locking plate formed with a recess, a lifting arm, a dog carried thereby to engage the recess to lock the arm in elevating position, and a rotary member formed with a projection to force the dog from the recess and with a stop lug to engage the dog and force the arm toward the recess.

2. In a raising and lowering means, a locking plate formed with a recess, a lifting arm, a dog carried thereby to engage the recess to lock the arm in elevating position, a rotary member formed with a projection to force the dog from the recess and with a stop lug to engage the dog and force the arm toward the recess, and a trip element coöperating with the dog to elevate the same beyond the stop lug in the release movement of the dog.

3. A raising and lowering means including a locking plate formed with a recess, a lifting arm, a dog carried thereby to engage the recess to lock the arm in elevating position, a rotary member formed with a projection to force the dog from the recess and with a stop lug to engage the dog and force the arm toward the recess, and a gravity operated trip element coöperating with the dog to force the same beyond the stop lug in the release movement of the dog.

In testimony whereof, I affix my signature in presence of two witnesses.

JOHN W. TROY.

Witnesses:
 PHILIP MIRAM MARTIN,
 BARNEY REYNOLDS.

Copies of this patent may be obtained for five cents each, by addressing the "Commissioner of Patents, Washington, D. C."